UNITED STATES PATENT OFFICE.

WILLIAM F. DOWNS, OF CHATHAM, NEW JERSEY.

PROCESS OF TREATING ALUNITE.

1,338,428.  Specification of Letters Patent.  Patented Apr. 27, 1920.

No Drawing.  Application filed December 14, 1917. Serial No. 207,085.

*To all whom it may concern:*

Be it known that I, WILLIAM F. DOWNS, a citizen of the United States, residing at Watchung Avenue, Chatham, in the county of Essex and State of New Jersey, have invented certain new and useful Improvements in Processes of Treating Alunite, of which the following is a specification.

This invention relates to a process of treating alunite and its novelty consists in the successive steps of the process, as will be hereinafter explained.

The object of the invention is to so treat the alunite as to change it from an insoluble to a soluble material and thus enable its potential values to be readily secured.

The composition of alunite, as given by the mineralogists, is substantially $Al_2O_3$ 37+ per cent.; $K_2O$ 11+ per cent.; $SO_3$ 38+ per cent. and $H_2O$ 13 per cent. This composition would naturally lead one to believe that there could readily be obtained from this material, potassium sulfate, aluminum sulfate, and alumina. The mineral however has long resisted efforts to obtain these substances therefrom on account of its insolubility in aqueous and acid solvents.

I have discovered that such insolubility is apparently caused by the silica which is always present in this mineral, as found in nature, and I therefore concluded that if the silica were altered, the mineral would respond to rational aqueous dissolving treatment such as might be expected from its chemical composition, and I further discovered that if a mixture of alunite and a substance yielding an alkali metal oxid compound be subjected to the action of heat under proper conditions, that it became altered to a condition of solubility without any loss of its values.

In practising the invention, the mixture of alunite and the alkali metal oxid compound carrying substance should be subjected to a uniform temperature throughout, which temperature should be below the point at which heated alunite gives off sulfur oxid fumes, which does not exceed 500° C. The alkali metal oxid compound carrying substance which yields its base to the sulfur radical under these conditions can be either a sodium or potassium carbonate or hydrate or other alkali metal compound, although I prefer to use carbonate on account of the economy. The practice followed in the manufacture of water glass indicates how the silica present may be altered and my investigations show that the alkali metal oxid compound carried in the mixture replaces all of the alumina held by the sulfur radical in the alunite if the alkali metal oxid compound is present in sufficient quantity. By this means I break up the bond of insolubility of the alunite and render it readily amenable to treatment.

The method which I prefer in carrying out my invention is as follows: I first clean the alunite by eliminating its acid-soluble impurities by treating it in a finely divided state to a bath of dilute mineral acid. This step may be omitted if the final products are not required to be pure, or if the alunite as found is practically free from such impurities. I then mix thoroughly with the clean powdered alunite, sodium carbonate or potassium carbonate in a quantity not less than that necessary to satisfy the sulfur radical present in excess of that already satisfied by the potassium in the particular kind of alunite treated, which quantity of sodium or potassium carbonate should always be previously determined by analysis.

I next heat the mixture uniformly to a temperature below that of the evolution of sulfur oxid fumes, in any apparatus suitable for that purpose, and I have found a revolving furnace quite convenient. I find no difference in the reaction whether the mixture is made wet or dry. Necessarily the preliminary heating will drive off the water if the mixture is made wet.

After the heating, which should be continued a sufficient length of time to insure the completion of the reaction, the product is put into leaching water and the soluble material is leached out. This solution, I find, contains all of the potassium in the alunite, as potassium sulfate, and also sulfate of the reagent used, to an amount represented by the quantity of $SO_3$ beyond that already satisfied by the potassium, and also any excess of reagent used beyond the combining power of the sulfur radical.

This solution is concentrated and may be marketed in that form or used as the material for further chemical operations. The insoluble residue is alumina and insoluble impurities, and may also be used as it is or as the basis of the manufacture of various alumina products.

The insoluble residue consists of alumina and the water-insoluble impurities present. These impurities are mainly silica and silicates present in the original alunite which were not disturbed by the preliminary dilute-mineral-acid bath, and were not rendered water-soluble by the influence of the heat and contact with the alkali-metal reagent used in the first heating operation already outlined. The object in treating this insoluble residue is to alter its alumina portion to a water-soluble form, and to maintain the impurities in a water-insoluble condition, whereby the alumina values of the original alunite can be obtained in a highly purified condition. To do this I mix with the insoluble residue, an amount of sodium carbonate, determined by analysis, to satisfy the alumina as sodium aluminate. This mixture is calcined at a temperature slightly above the formation of sodium silicate, and below that of fusion. I find this temperature to be about 950° C. This temperature may be exceeded somewhat without interfering with satisfactory results. The silica and silicates at this temperature will take up not only alkali metal oxid compounds, but also oxids of the alkaline earths present, such as CaO, MgO, or $Al_2O_3$, and thus form insoluble complex silicates similar to the natural feldspars. So long as the temperature is below fusion any increase of temperature over that necessary to form sodium silicate will result simply in increasing the basicity of the silicates formed. The great proportion of basic oxids, principally of alumina, present, renders this mixture quite infusible, and gives a large leeway in temperature, but I aim to keep the temperature as near the minimum point as possible. After this heating, which like the first heating, may be done in any convenient form of apparatus, which gives uniformity of heat penetration, the mixture is subjected to the solvent action of water. The filtrate from this solution will carry sodium aluminate free from impurities from which the alumina can be precipitated as hydrate by the use of carbonic acid, or by any other method well known to those familiar with the art. I prefer the use of carbonic acid, as it at once regenerates the sodium carbonate and this can then be returned to the cycle of operation. The insoluble residue from this second leaching will be found to contain the impurities of the original alunite which were not eliminated by the preliminary mineral-acid bath, and need not be further considered here, as they will usually be thrown away.

I claim:—

1. The method of obtaining the potassium and aluminum values from alunite, which consists in first subjecting powdered alunite to a dilute mineral acid bath to remove its acid-soluble impurities, and then subjecting the so-cleaned alunite, after mixing with an alkali-metal oxid compound, to the action of heat below the temperature of the evolution of $SO_3$ fumes, about 500° C.; then, after dissolving in water and filtering the solution of sulfates and other water-soluble salts, subjecting the insoluble portion to a higher temperature, about 950° C., after mixing with it sufficient sodium carbonate to satisfy the alumina present as sodium aluminate; and finally dissolving the water-soluble sodium aluminate from the insoluble impurities of this re-heated portion, and recovering the aluminum values from this solution.

2. The method of obtaining the potassium and aluminum values from alunite, which consists in first subjecting powdered alunite to a dilute mineral acid bath to remove its acid-soluble impurities, and then subjecting the so-cleaned alunite, after mixing with sodium carbonate, to the action of heat below the temperature of the evolution of $SO_3$ fumes, about 500° C.; then, after dissolving in water and filtering the solution of sulfates and other water-soluble salts, subjecting the insoluble portion to a higher temperature, about 950° C., after mixing with it sufficient sodium carbonate to satisfy the alumina present as sodium aluminate; and finally dissolving the water-soluble sodium aluminate from the insoluble impurities of this reheated portion, and recovering the aluminum values from this solution.

3. The method of obtaining the potassium and aluminum values from clean alunite which consists in mixing with the powdered alunite, sodium carbonate and subjecting the mixture to the action of heat below the temperature of the evolution of $SO_3$ fumes, about 500° C.; then, after dissolving in water and filtering the solution of sulfates and other water-soluble salts, subjecting the insoluble portion to a higher temperature, about 950° C., after mixing with it sufficient sodium carbonate to satisfy the alumina present as sodium aluminate; and finally dissolving the water-soluble sodium aluminate from the insoluble impurities of this re-heated portion, and recovering the aluminum values from this solution.

4. The method of obtaining the potassium and aluminum values from alunite, which consists in first subjecting powdered alunite to a dilute mineral acid bath to remove its acid-soluble impurities, and then subjecting the so-cleaned alunite, after mixing with an alkali metal carbonate, to the action of heat below the temperature of the evolution of $SO_3$ fumes, about 500° C.; then, after dissolving in water and filtering the solution of sulfates and other water-soluble salts, subjecting the insoluble portion to a higher temperature, about 950° C., after mixing with it sufficient sodium carbonate to satisfy the alumina present as sodium aluminate; and finally dissolving the water-soluble sodium aluminate from the insoluble impurities of this re-heated portion, and recovering the aluminum values from this solution.

5. The method of obtaining the potassium and aluminum values from clean alunite which consists in mixing with the powdered alunite, an alkali metal carbonate, and subjecting the mixture to the action of heat below the temperature of the evolution of $SO_3$ fumes, about 500° C.; then, after dissolving in water and filtering the solution of sulfates and other water-soluble salts, subjecting the insoluble portion to a higher temperature, about 950° C., after mixing with it sufficient sodium carbonate to satisfy the alumina present as sodium aluminate; and finally dissolving the water-soluble sodium aluminate from the insoluble impurities of this re-heated portion, and recovering the aluminum values from this solution.

In testimony whereof I affix my signature.

WILLIAM F. DOWNS.